United States Patent [19]

Eibert et al.

[11] Patent Number: 4,701,047

[45] Date of Patent: Oct. 20, 1987

[54] LINE SELECTION FOR PREPARING RANGE IMAGES

[75] Inventors: Max Eibert, Friedrichshafen; Peter Lux, Langenargen; Walter Metzdorf, Friedrichshafen, all of Fed. Rep. of Germany

[73] Assignee: Dornier GmbH, Friedrichshafen, Fed. Rep. of Germany

[21] Appl. No.: 745,405

[22] Filed: Jun. 14, 1985

[30] Foreign Application Priority Data

Jun. 22, 1984 [DE] Fed. Rep. of Germany ....... 3423135

[51] Int. Cl.⁴ .......................... G01C 3/00; G01B 11/24
[52] U.S. Cl. ........................................ 356/1; 356/376
[58] Field of Search ....................... 356/1, 4, 152, 375, 356/376; 364/561; 358/212, 213

[56] References Cited

U.S. PATENT DOCUMENTS

| | | | |
|---|---|---|---|
| 4,119,379 | 10/1978 | Zindler | 356/4 |
| 4,136,957 | 1/1979 | Uno et al. | 356/375 |
| 4,317,991 | 3/1982 | Stauffer | 356/4 |
| 4,322,752 | 3/1982 | Bixby | 358/213 |
| 4,508,452 | 4/1985 | DiMatteo et al. | 356/376 |

*Primary Examiner*—L. T. Hix
*Assistant Examiner*—D. R. Rutledge
*Attorney, Agent, or Firm*—Ralf H. Siegemund

[57] ABSTRACT

Selecting of particular image lines for composition of range image such that a composition and evaluation of range image is possible in real time actually corresponds to the imaging of a TV or video camera. The image field is scanned column by column and the contents of the column (all lines) are read in parallel. After digitizing the content of the column, a selection logic selects a particular imaging dot within each of the columns. Using the principles of triangulation, the line position of the dot selected is identified by a multibit binary data word is vertical position in representation of the distance from the camera or the light strip source.

10 Claims, 4 Drawing Figures

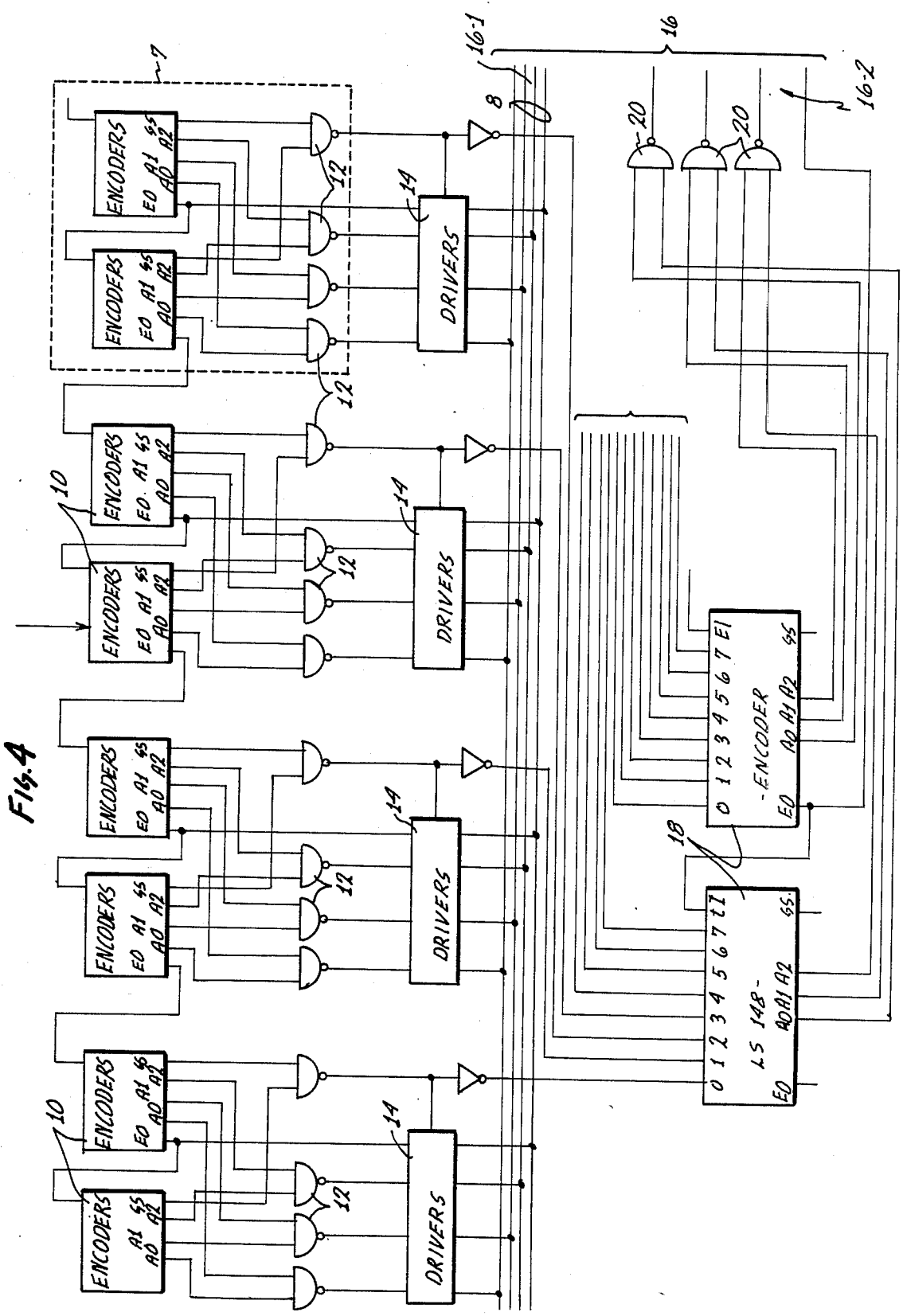

LINE SELECTION FOR PREPARING RANGE IMAGES

BACKGROUND OF THE INVENTION

The present invention relates to the selection of a line from within an image for purposes of composing a distance or range representing image. The invention in particular relates to the selection of particular lines from such an image having been acquired under utilization of a triangulating measurement principle.

Generally speaking a range image depicts an object, not in a manner in which the individual image points represent brightness value of reflection or emission and/or of the object, but an image point represents a distance value between the object point and a reference point such as is given by the measuring equipment. Methods are known for two dimensional measuring range and distance information so as to establish a range image (see for example P. Levi in Electronik 12, 1983). These known methods can basically be divided into two groups which differ in the process of acquisition data i.e. on the basis of the physics underlying the measurement principles. In one method one uses transit time of electromagnetic or acoustic waves; the other method is based on triangulation. The first mentioned principle is suitable for measuring ranges from infinity down to about 1 meter distance and the accuracy depending on the frequency employed, can be as good as 1 mm. The second principle is for reasons of accuracy limited to short distances of about 1 m and less.

The system and methods using transit time measurement are disadvantaged by the fact that generally the distance ascertained extends between the sensor and the particular point being measured. In one produces for example a complete image through beam deflection for example by means of a rotating or oscillating mirror one obtains a rather elaborate system and the components both the mechanical and the optical ones are quite expensive. Triangulation permits simultaneous acquisition over an entire line for the range image to be produced. Herein a thin light strip is suitably projected upon an object and observed by a videocamera or the like whereby the viewing axis of the camera and the direction of illumination have a nonzero angle between them. This angle is the basis for a triangulation method and is shown in principle in FIG. 1; the image produced by the camera is for example shown in FIG. 2. One can see the location of the light strip in real space as well as the corresponding image lines which are at that point not range image lines but "real" ones, they are offset to some extent at a magnitude which corresponds to the difference between object and background as far as distance from the acquiring equipment is concerned. The range image is then composed from this information. The known practice of this method is disadvantaged by the fact that the selection time and the assembly time for a complete range image, assuming CCIR video standards and assuming further 50 fields per second, one requires a 5 second assembly time for 256 range image lines.

DESCRIPTION OF THE INVENTION

It is an object of the present invention to provide a new and improved method for selecting a particular image lines ultimately for the composition of a range image such that the accuracy and the selection speed of the CCIR standard can be attained, and that a composition and evaluation of range images is possible in real time actually corresponds to the imaging of a TV or video camera.

Therefore it is a general object of the present invention to provide a new and improved method for selecting image lines to operate at a speed to track video imaging in real time.

It is a specific object of the invention to provide a new and and improved method and equipment for electing an image line pursuant to the acquisition and formation of range images, using the illumination of object field by means of a light strip and observing the object field by means of an imaging device wherein the optical axes of the light strip and of the imaging device having a particular angle for purposes of obtaining triangulation.

It is thus a feature of the invention to retain the principles of triangulation for range image data acquisition and also to use the principle of projecting a light strip or line upon the object.

In accordance with the preferred embodiment of the present invention it is suggested to cyclically read in parallel the entire content of a column of an image sensing device, to digitize the content of that column whereupon through logical selection a significant video line is selected and ascertained; in a decoder this line will be associated with a binary code corresponding to a relevent distance value. Each image point will be preferably associated with a binary value and in the selection logic the first or the last line having a particular digital value; in case of data grouping the average position is searched for. This will be the case if the illuminating light strip covers an area more than one video or sensor line.

The inventive method therefore permits generation and selection of an image line from within for example 256 columns and this is achievable with available components to meet television standards of about 550 ns/cycle period so that the selection requires only a total period of time of about 128 microseconds.

In accordance with the invention it was recognized that for selecting a particular true video line for purposes of composing a range image it is not necessary to call on all gray values of all image points and to process them accordingly but it is sufficient to ascertain within the image field the level of a distance significant image line, separately for each column of image points and to process the location of that significant image line further. Thus the image as a whole is cyclically read out column by column whereby the image information of an entire column covering therefore all lines is processed simultaneously. For this one can use regular TV cameras, CCD-s, CID-s, or arrays of photodiodes whereby all of these devices are usually addressable for readout in a column by column basis, all lines in parallel.

The image content of a signal column is fed in parallel to an A-D converter which digitizes the imformation. In the most simple case each image point may either be represented by a binary zero or by a binary one. This conversion depends on a threshold basis or level and is generally dependent upon illumination and background brightness. Therefore in a simple manner the significant image lines may be bright, while the background is dark, so that on readout of a column only one dot or, possibly a few—if the light strip is too wide, are identified by binary 1, the remainder of the points should be binary 0's. The output of the A-D converter is constituted by as many binary information items as the image has lines, for example 256. This 256 bit assembly pertaining to one column is fed in parallel to a selection logic wherein in accordance with particular priority criteria, the relevant image line is searched for and selected, so as to select the image of the light strip.

The selected output is fed to a decoder wherein the significant line as was detected by the selection circuit is converted into a digital word whereby in case of 256 lines, an 8 position binary word is produced indicating the level of the image point that represents the light strip. Owing to triangulation, that level is directly proportional to distance. The process is repeated for the next column until all columns have been interrogated and now the particular video image is represented by a sequence of binary words (as many as there are columns) representing the level in toto within that image field distance of reflecting the light strip. These binary words which are in fact as many as the image has columns are now processed further. The resulting information represents a range image line; by vertical scan, a range image will be composed.

The strip illumination may be produced by a dot cooperating with a mechanical deflection unit such as an oscillating or rotating mirror, or an electronic light deflection through controlled liquid crystal aperture or the like and is produced at sufficiently high rate so that the object is scanned in a line at least as fast as all columns are read out. There may be avertical scan superimposed but alternatively the object may be moved as indicated and to be explained more fully below with reference to FIG. 1. The video images as represented by binary words can be processed by computer for recognizing an object in handling systems or the like and can be indicated on a monitor after suitable A–D conversion and after the requisite synchronous signals have been added.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 4 is a circuit diagram showing the decoder and the selection logic for purposes of decoding.

Figure 1:
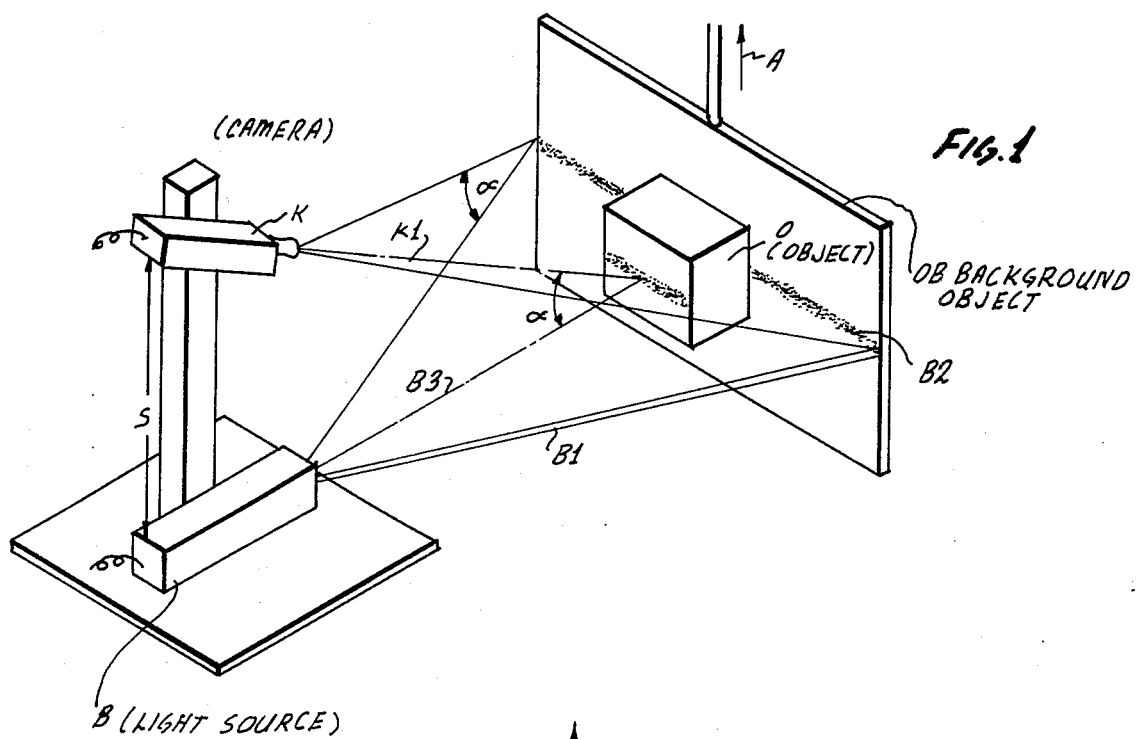
FIG. 1 is a schematic showing for explaining in principle the acquisition of a range image on the basis of triangulation.
Figure 2:
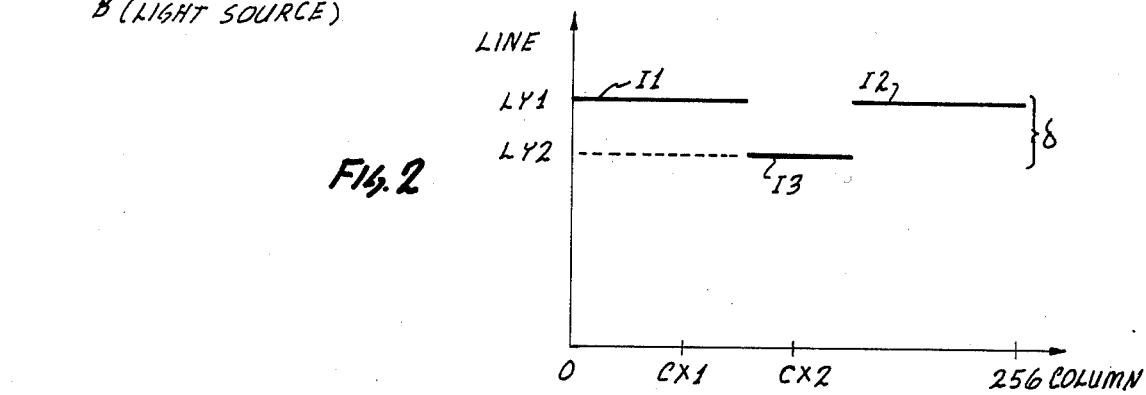
FIG. 2 is a typical image line produced as video line as per FIG. 1.

Proceeding now to the detailed description of the drawings reference is made first to FIG. 1 and 2 explaining the acquisition of video in formation by triangulation and the range images by that process. The equipment used for practicing the immediate image acquisition method generally includes a source of light B which emits a flat beam B1 covering a particular angular range but being in the vertical extremely thin to thereby create a light strip B2. This light strip is projected on the object O extending from a background object OB. The background object OB, such as a plate is moved in direction of arrow A, at exactly right angles to the plane of beam B1, i.e. the axis B2 of that beam. This way one obtains a vertical scan, ultimately for composing a range image by synthetizing range image lines. That composition process of one range image line forms the bulk of the description below.

Camera K or, more generally, an image field sensor observes a particular field of view and is arranged so that an acute angle develops between the axis B3 of illumination and the axis K1 of the camera. As seen from the camera K, the light strip B2 is reflected by the projecting object and will be in a different height within the tilted field of view, as compared with the reflection of the light strip by the background object OB. From the displacement of the two reflections and for a known angle between the axes B3 and K1 and for the known spacing S between the camera (particularly the image plane) and the source B of illumination, the distance between the object and the background can be calculated as a relative distance value. This relative distance value can then be used for the generation of a range image line.

FIG. 2 shows what the image of that particular strip and as observed by camera looks like. One can see the image portions I1 and I2 which result from the reflection of strip B2 by the background object OB and due to the displacement and angular offset, the reflection I3 of the strip B2 by the object O is at a somewhat lower level. The offset delta corresponds to the difference in distance between object and background and that distance is therefore ascertainable by triangulation so that the image as depicted in FIG. 2 is immediately and directly available for determining the relative spacing of the object vis-a-vis the background object OB. This being the general operating condition, known values for the angle camera K (axis K1) and source B (axis B3) have in relation to each other as well as the distances between camera K and source B permit determination of the distance of either the background or of the object itself in absolute terms from the source B as stated and this information is then used to generate a range image. The object combination O and OB is moved in direction of arrow A and one can generate a range image of the entire background (OB) with object O thereon; the object filed is scanned vertically by the movement as indicated.

Figure 3:
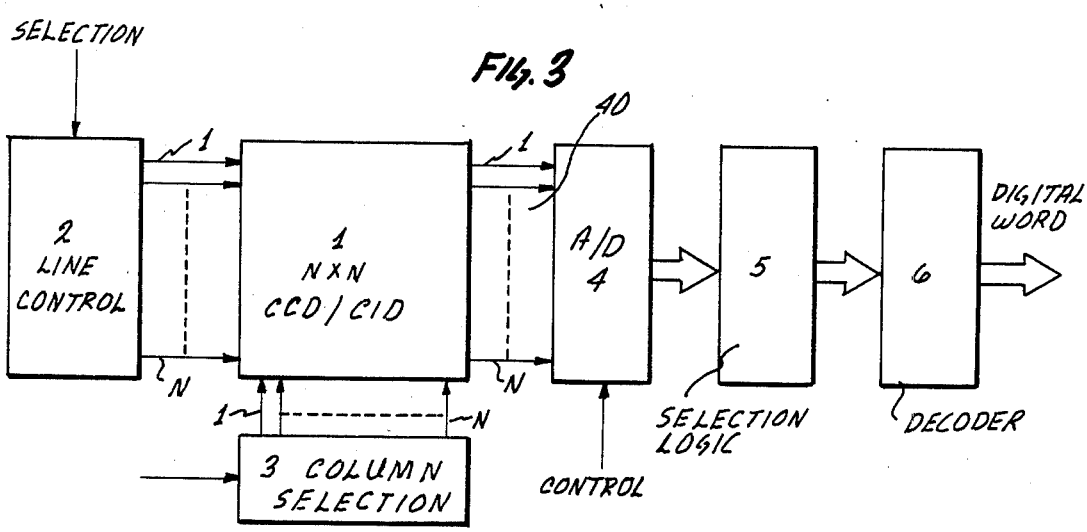
FIG. 3 is a block diagram explaining apparatus and method in accordance with the preferred embodiment of the present invention for practicing the best mode thereof.

Proceeding now to the description of FIG. 3 a block diagram is illustrated and particularly an image sensor 1 is provided to be realized either by CCD or CID, or photodiode device having in either case NXN imaging points. This sensor is used in lieu of a video camera K as a more pratical instrument to realize the invention. Lines of this array of image point sensors can be called upon by the control and addressing logic 2; columns are called upon and accessed by the control 3. The column control operates in synchronism with a clock while line control is carried out in accordance with particular desired selection criteria as will be developed shortly. Reference numeral 40 refers to an output bus of the sensor 1 providing the input for an A–D converter 4 operating in parallel and being capable of converting all image points of all lines in the selected column into a digital value as a series of digitalization progresses in accordance with the column control. Reference numeral 5 refers to the selection logic and 6 is a decoder.

In order to acquire a particular image line the line control 2 selects all N lines simultaneously so that readout can be obtained column by column through the control 3. With each clock cycle a particular column is selected and the content is digitized into N digital image values by means of the digitizer 4. Depending upon the brightness of both illumination and general background, the digitizer 4 will produce brightness signals in digital form pertaining to the selected column. In the evaluation and selection logic 5 certain priority criteria to be explained more fully below, are used for identifying the formation of a digital value representing a significant line. By way of a selection example the relative elevation profile of the lowest line having a nonzero digital value is selected. Next decoding occurs in 6; herein the selected line is converted into a digital or binary value. That value now corresponds to a distance value of an image line point having now a position which is determined by the selected sensor column. That digital value can then be used to generate a range image point.

The digitizer 4 may simply be composed of N different comparators which are operated on the basis of certain threshold values. This threshold value may be manually adjusted or be given by an average value over the entire output level as provided in any instance. The comparators may be constructed as discrete elements or highly integrated as is usually the case in A-D converters. The output of circuit 4 is provided in the form of N digital signals simply being a binary 1, or a binary 0.

By way of example it may be assumed that the plate OB has particular position and the sensor 1 (or camera K) observes a relevant field of view such that (real) image lines I1, I2 and I3 are produced for exammple on the array 1. The array is now scanned by (permanently) selecting all lines and by running through the columns one by one for read out. Assuming that column CX1 has been selected then the digital output for the N lines from converter 4 will be binary zeros, except for line LY1 a binary 1 will be produced. For a selected column CX2 there will be again all zeros except that one output corresponding to line LY2 will hold a digital value 1. Thus, upon running through all N (e.g. 256) columns 256 data words are produced by the digitizer 4, each word having 256 bits of which in the present case 255 are zeros, and one is a "one" that "one" is in the same position for all columns wherein the image line I1 coincides with array line LY1; the "one" shifts to a different position for I3 (delta) while the column scan runs over it, and the "one" shifts back for the remainder of the columns while I2 is being scanned.

FIG. 4 illustrates in detail an example for a selection logic circuit 5 and a decoder 6. The circuit illustrates the top portion of 64 input lines being 64 output lines or the total of 256 lines from the A-D converter 4. The 64 outputs are fed in groups of eight to priority decoders 10 providing an eight to three priority encoding operation. Devices suitable for this purpose are known under the designation LS 148 as traded by Texas Instruments. The outputs of these encoders 10 are linked through nand circuits 12 of the LSOO variety traded by TI and the linked outputs or the Nand circuits are fed to four bus line drivers 14 for example of the LS 241 variety. These drivers 14 feed data bus portions 16-1 being of the LSO4 variety. There are of course additional drivers 14 from the other outputs of digitizer 4 with their associate nand gates such as 12.

Every fourth nand gate output (of the twelve gates 12) is run to one of two further eight-to-three priority encoders 18 being of the LS 148 variety already mentioned. Also, the altogether twelve nand outputs from the other (65 to 256) A-D outputs are fed to these encoders 18. The outputs of circuits 18 are run through nand gates 20, to output bus portions 16-2. Therefore that output bus 16 holds an 8-bit binary word which in effect describes the relevant level of an image line point of a significant and selected image line; always for one column as selected by circuit 3. The selection circuit of FIG. 4 now will in this particular example select either the first or the last of the N signals corresponding to a particular illuminated light dot, e.g. the dot pertaining to the image point defined by the intersection of column CX1 and of line LY1. The eight bit word on bus 16 defines the position of that dot in the field of view.

The entire arrangement in fact is organized so that component groups 7 establish a 16 to 4 priority decoder. In this particular example decoding requires sixteen of these groups 7 so as to accomodate all 256 data lines from the digitizer 4. Only four of them are shown by way of example. The cross linking of the various groups of circuits is made such that as a particular group having a "higher" identification number (line number) recognizes a signal (binary one), any other circuit group 7 having lower line numbers will be prevented from passing on any binary "one" should it recognize one. By way of example, a spurious dot such as D in FIG. 2 will be suppressed in that fashion. Only one of these sixteen groups 7 must pass on a signal which differs from zero. That signal corresponds to the position of the highest valued data line (LY) being the one that receives a valid input signal within a particular group 7. This information is associated to the lower level portion of the output signal in data bus 16-1. Thus, as such, the digital information on bus portion 16-1 represents merely the specific location of selected image line within any group 7, whereby each group 7 covers, so to speak, four real image lines. The circuits 18 so to speak determine which of the sixteen groups 7 has furnished the four low value bits and the determination results in the high order bits on bus portion 16-2. The second part of the priority decoding circuit has thus the task to determine the relative position of the particular group 7 that has responded, within the sixteen possibilities of accessing, to thereby determine the four highest value bits of the data word that describes the selected line. This task is also accomplished by means of a circuit basically corresponding to one of the groups 7 and being composed of 18 and 20 whereby the input signal for that particular group uses a signal which indicates presence of information within that particular group. One can also say that the bus 16-2 identifies which of the sixteen groups 7 has responded and defines therefore the image line position on a coarse scale, identifying the particular decoder group 7 within which the significant line dot was detected. Bus 16-1 identifies the particular image line within that group 7.

The decoder output on bus 16 (16-1, 2) is thus a series of eight bits words, one word per scanning column of array sensor 1, amounting altogether to 256 words. These words are repeated at frame image rate. The 256, eight bit words identifying real image line locations, actually identify distance values and are thus usable directly as grey values for image points of one range image line. The next frame so processed finds the object-imaging situation modified by the movement of OB as per arrow A for example by the width of the illuminating strip B2. In so many frame the entire "object", being the combination OB and O passes across light strip B2, and the plurality of frames each identified by 256 words (from decoder output 16) permits the assembly of a range image. It should be noted however, that as stated the information contained in the 256 words associated with one frame permits already the formation (and calculation) of one range image line, identified by the background line portions (I1 and I3), or any toher background information that relates the relative position of relfections of previous frames to the current frame. The entire circuit runs in real time corresponding to the operation of the video camera, i.e. the signal acquisition by the sensor 1.

The invention is not limited to the embodiments described above, but all changes and modifications thereof, not constituting departures from the spirit and scope of the invention are intended to be included.

We claim:

1. A method of selecting an image line pursuant to the acquisition and formation of range images, comprising the steps of illuminating an object field by means of a light strip;

observing the object field by means of an imaging device, whereby optical axes of the light strip and of the imaging device have a particular angle in a plane transverse to a long extension of the light strip, for purposes of obtaining triangulation;

operating the imaging device so as to scan the image field column by column parallel to said plane and reading the content of a column, covering all image lines, in parallel;

digitizing the content of each column as read;

selecting in accordance with a selection logic a particular imaging dot within each of the columns as digitized; and identifying the line position of that dot in vertical direction by a multibit binary data word in vertical direction in representation of the distance from the camera or the light strip source.

2. In a method as in claim 1, wherein the selection step is carried out by preferring one image dot over others within a preselected numeric order of line identification.

3. Apparatus for processing video images comprising:
a column scanning video receiver;
an illumination source producing a light strip, the receiver and the source being oriented so that their respective optical axes have a constant non-zero angle in relation to each other and in a plane transverse to the light stop as produced;

means included in the receiver for column scanning the receiver and reading out all lines in parallel from each column;

a digitizer connected to the receiver for digitizing in parallel outputs resulting from the scanning to obtain in parallel a multidigit representation of all lines of a column;

means connected to the digitizer for selecting particular image information values for one line from each such representation, and respectively for all columns as scanned; and means connected to the means for selecting, for decoding the selected information for obtaining distance representing value on account of the level of the selected line.

4. Apparatus as in claim 3, the digitizer being a plurality of threshold circuits there being as many circuits as there are lines.

5. Apparatus as in claim 3, wherein the decoding means includes a first part identifying digitally a group of lines one of which holds the selected line image information, and a second part identifying the line within that group.

6. Apparatus as in claim 3, the video receiver being a video camera.

7. Apparatus as in claim 3, the video receiver being a CCD device.

8. Apparatus as in claim 3, the video receiver being a CID device.

9. Apparatus as in claim 3, the video receiver being a photodiode array.

10. Apparatus as in claim 5 the decoding means including a plurality of eight-to-three priority decoders and nand gates connected to the decoders, the first part including some of the nand gates and bus line drives connected thereto, the second part being constituted by eight-to-three priority decoders connected to the remaining nand gates.

* * * * *